United States Patent [19]

Murata

[11] Patent Number: 4,571,165
[45] Date of Patent: Feb. 18, 1986

[54] ROTOR HOUSING FOR ROTARY PISTON ENGINES

[75] Inventor: Yoshinori Murata, Hiroshima, Japan

[73] Assignee: Mazda Motor Corporation, Hiroshima, Japan

[21] Appl. No.: 635,527

[22] Filed: Jul. 30, 1984

[30] Foreign Application Priority Data

Aug. 29, 1983 [JP] Japan .................... 58-158251

[51] Int. Cl.$^4$ ............................................. F01C 1/22
[52] U.S. Cl. ................................................... 418/178
[58] Field of Search ............... 418/152, 178, 179; 428/621, 626, 639, 614, 667, 327, 422; 75/230, 231

[56] References Cited

U.S. PATENT DOCUMENTS

| | | | |
|---|---|---|---|
| 2,859,158 | 11/1958 | Schaer | 428/667 |
| 3,421,972 | 1/1969 | Cromwell | 428/626 |
| 3,743,556 | 7/1973 | Breton | 428/639 |
| 3,888,746 | 6/1975 | Uy | 418/178 |
| 3,970,527 | 7/1976 | Brown | 418/178 |

FOREIGN PATENT DOCUMENTS 49-25312  3/1974  Japan .

Primary Examiner—Leonard E. Smith
Assistant Examiner—Jane Obee
Attorney, Agent, or Firm—Fleit, Jacobson, Cohn & Price

[57] ABSTRACT

A rotor housing for rotary piston engines has an inner wall formed with a first layer of chromium plating, and a second layer of nickel-fluorine resin composite plating formed on the first layer. The second layer of composite plating includes 9 to 40 vol. % of fluorine resin particles dispersed in nickel matrix and has a thickness of 5 to 25 microns.

2 Claims, 10 Drawing Figures

ROTOR HOUSING FOR ROTARY PISTON ENGINES

The present invention relates to a rotary piston engines and more particularly to rotor housing of a rotary piston engine. More specifically, the present invention pertains to a surface treatment of a rotor housing which is effective to establish an intimate relationship between the rotor housing and apex seals.

A rotary piston engine includes a casing comprised of a rotor housing having an inner wall of trochoidal configuration and pair of side housings attached to the opposite sides of the rotor housing. A rotor of substantially polygonal configuration is disposed in the casing with apex portions in sliding engagement with the trochoidal inner wall of the rotor housing. In order to provide a gas-tight sliding engagement between the apex portions on the rotor and the inner wall of the rotor housing, each apex portion of the rotor is provided with an apex seal which slides on the inner wall of the rotor housing.

It has been experienced in conventional rotary piston engines, the inner wall of the rotary piston engine is subjected to uneven wear through the sliding engagement with the apex seals producing so-called chatter marks so that efforts have been made to provide a rotary housing with an inner wall which is resistant to wear so that it is substantially free from chatter marks but is not harmful to apex seals in respect of wear and seizure of the apex seals. For example, in Japanese patent application No. 47-65032 which has been filed on July 30, 1972 and disclosed for public inspection on Mar. 6, 1974 under the disclosure number of 49-25312, there is proposed to provide the inner wall of the rotor housing with a plating layer of carbon fluoride eutectic metal in which fine particles of carbon fluoride are uniformly dispersed in the base metal of the plating layer. This rotor housing is considered as being suitable for use with apex seals made of a metal or a carbon-metal composite material since the lubricating property which the carbon fluoride possesses is effective to prevent seizure between the apex seals and the rotor housing inner wall and to suppress uneven wear or chatter marks of the rotor housing inner wall simultaneously suppressing wear of the apex seals.

It should however be noted that the proposed rotor housing still has a problem in that the plating layer does not have a satisfactorily low friction coefficient and has a high surface hardness. These properties of the plating layer make it difficult to establish an intimate relationship between the apex seal and the inner wall of the rotor housing. Usually, such intimate relationship is established through a sliding engagement between the apex seal and the rotor housing inner wall by wear at the engaging surfaces which eventually forms very smooth sliding surfaces. However, in the rotor housing as proposed by the Japanese patent application, smooth surfaces are not formed quickly in break-in operations of the engine so that there is a high possibility that pressure leaks between the engaging apex seal and the rotor housing inner wall due to the roughness of the sliding surfaces. Such pressure leakage often causes a loss of compressed pressure in the working chamber which may lead to an ignition failure and a decrease in the engine output.

Trials have also been made by forming the inner wall of the rotor housing either with a hard chromium plating layer or with a soft plating layer such as a tin plating layer, however, they have not been successful since there have been significant wears in the apex seals. It has been known to supply the inner wall of the rotor housing with lubricating oil or liquid lubricant mixed with molybdenum disulfide to form a lubricating liquid film on the rotor housing inner wall. It has also been tried to form a coating of solid lubricant such as molybdenum disulfide on the rotor housing inner wall. However, these trials have not been successful in fuel injection type rotary piston engines since in this type of engines a part of the injected fuel is introduced into the working chamber without being atomized and deposited on the rotor housing inner wall destroying the lubricating liquid film or weakening the solid lubricant film.

It is therefore an object of the present invention to provide a rotor housing having an inner wall provided with a plating layer which does not have a problem of seizure with apex seals and can prevent uneven wear which may lead to chatter marks on the rotor housing inner wall.

Another object of the present invention is to provide a rotor housing which does not cause a serious wear of apex seals.

A further object of the present invention is to provide a rotor housing having an inner wall which can readily brought into an intimate condition with apex seals in break-in operations of the engine so that any possibility of misfire and output loss can effectively be prevented.

Still further object of the present invention is to provide a rotor housing having an inner wall formed with a plating layer of lubricating property which is not destroyed even in a fuel injection type engine.

According to the present invention, the above and other objects can be accomplished by a rotor housing for rotary piston engines, which has an inner wall formed with a first layer of chromium plating, and a second layer of nickel-fluorine resin composite plating formed on said first layer, said second layer of composite plating including 9 to 40 vol. % of fluorine resin particles dispersed in nickel matrix and having a thickness of 5 to 25 microns. Since the composite plating layer has a low friction coefficient so that it can provide a satisfactory lubrication between the apex seal and the inner wall of the rotor housing. Further, since the composite plating layer has a low surface hardness, the sliding surfaces can be rapidly smoothened in break-in operations of the engines to establish an intimate relationship between the sliding surfaces. It is therefore possible to prevent any loss of compressed pressure in the engine break-in operations.

It is preferable to use tetrafluoroethylene as the fluorine resin in the composite plating layer. Alternatively, use may be made of tetrafluoroethylene/hexafluoropropylene copolymer or tetrafluoroethylene-perfluoroalkylvinylether copolymer. With the fluorine resin content less than 9 vol. %, the hardness of the composite plating layer is undesirably increased so that the intimate relationship is not established in a reasonably short period. However, if fluorine resin content in the composite plating layer is greater than 40 vol. %, a sufficient adhesion cannot be maintained between the first and second layers and there may be a danger of the second layer being peeled off. With the composite plating layer less than 5 microns thick, the durability of the second layer will become insufficient and the second layer may be worn off before the engine break-in operations are finished. A composite plating layer thickness greater than 25 microns will lead to a poor adhesion between the first and second layers.

In general, an increase in quantity of the fluorine resin particles provides an improved result in respect of intimacy and self-lubricating property between the rotor housing inner wall and the apex seal whereas a decrease in quantity of the fluorine resin particles causes an increase in the hardness. The fluorine resin particles may preferably have particle size of 0.3 to 3 microns in diameter. If the particle size is larger than 3 microns, a sufficient adhesion will not be obtained with the base plating metal, that is, nickel. The lower limit of the particle size is derived since it is difficult to manufacture fluorine resin particles of less than 0.3 microns in diameter.

The above and other objects and features of the present invention will become apparent from the following descriptions of preferred embodiments taking reference to the accompanying drawings, in which.

Figure 1:
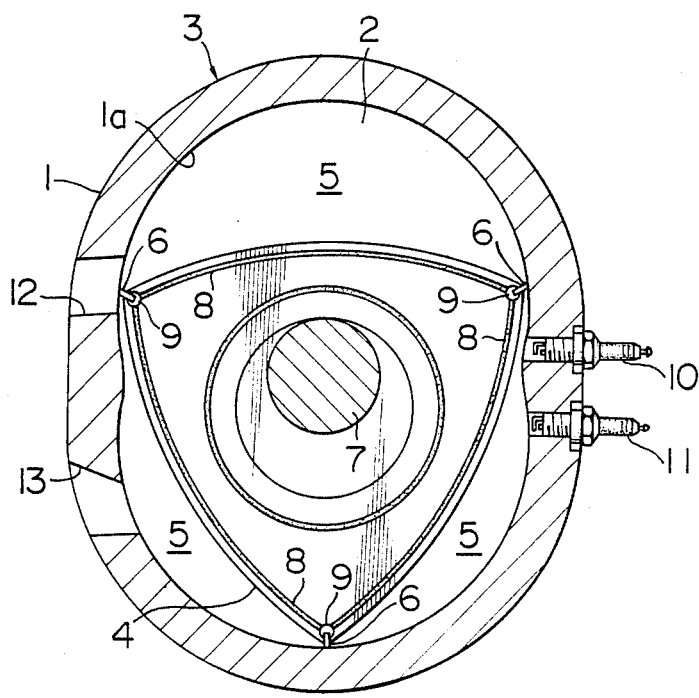
FIG. 1 is a cross-sectional view of a rotary piston engine having a rotor housing in which the present invention can be applied.

Referring now to the drawings, particularly to FIG. 1, there is shown a rotary piston engine including a casing 3 which is constituted by a rotor housing 1 having an inner wall surface 1a of a trochoidal configuration and a pair of side housings 2 secured to the opposite sides of the rotor housing 1, although only one of the side housings 2 is shown in FIG. 1. In the casing 3, there is a rotor 4 of substantially triangular configuration which is carried by an eccentric shaft 7 for sliding movement with apex portions in sliding engagement with the inner wall 1a of the rotor housing 1. The rotor 4 defines three working chambers 5 in the casing 3, of which volumes cyclically change as the rotor rotates to conduct in sequence the intake, compression, combustion, expansion and exhaust cycles. The rotor 4 is provided at each apex portion with an apex seal 6 which is maintained in sliding engagement with the inner wall 1a of the rotor housing 1. The rotor 4 further carries side seals 8 on its side surfaces and corner seals 9 at the opposite ends of the apex seals 6. As well known in the art, the rotor housing 1 is formed with an intake port 12 and an exhaust port 13. Ignition plugs 10 and 11 are mounted on the rotor housing 1. Although not shown in FIG. 1, the intake port 12 is connected with an intake passage and a fuel injection valve is mounted on the intake passage in the case where the engine is of a fuel injection type.

Figure 2:
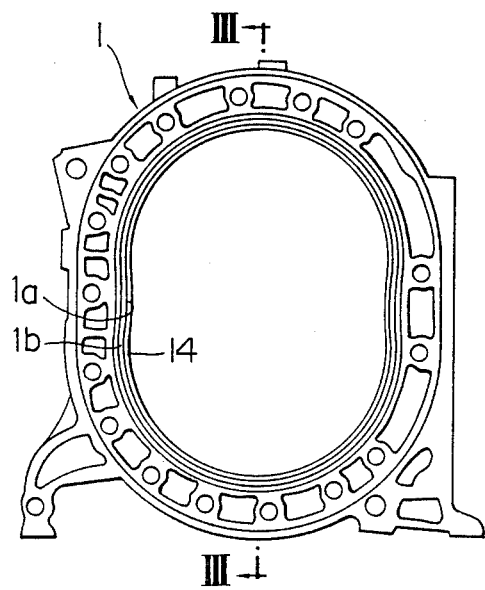
FIG. 2 is an axial end view of the rotor housing.
Figure 3:
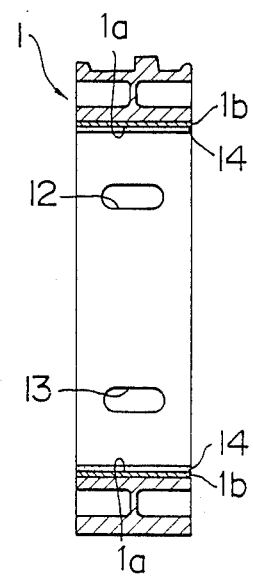
FIG. 3 is a sectional view taken substantially along the line III—III in FIG. 2.

In the embodiment shown in FIGS. 2 and 3, the rotor housing 1 is formed at the inner surface with a chromium plating layer 1b and the inner surface 1a is defined by the surface of the chromium plating layer 1b. On the chromium plating layer 1b, there is formed a nickel-fluorine resin composite plating layer 14 containing 9 to 40 vol. % of flourine resin particles dispersed in the base nickel matrix. The composite plating layer 14 is 5 to 25 microns thick.

Figure 4:
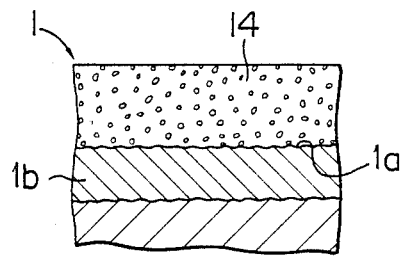
FIG. 4 is an enlarged fragmentary sectional view showing the inner wall surface of the rotor housing in accordance with one embodiment of the present invention.
Figure 5:
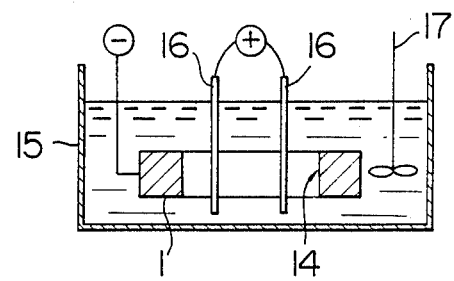
FIG. 5 is a diagrammatical illustration of an electrolytic plating device which may be used in manufacturing the rotor housing of the present invention.

In forming the plating layer 14, the inner surface 1a of the rotor housing 1 is at first subjected to alkaline dewaxing treatments by negative and positive polarization methods for three minutes and to an alkaline dipping dewaxing treatment, and thereafter washed by water. Then, the inner surface 1a of the rotor housing 1 is washed by 10% HCl water solution for 10 seconds. Thereafter the rotor housing is washed by water. The rotor housing is then subjected to a nickel plating process for 1 minute by using wood solution to form a nickel plating layer of 0.3 to 0.5 microns thick on the chromium plating layer 1b. After washing by water, the rotor housing is subjected to an electrolytic plating process for 20 minutes by using a sulfamic acid solution mixed with particles of fluorine resin to produce a nickel-fluorine resin composite plating layer containing fluorine resin particles dispersed in the base nickel matrix. The last mentioned process is carried by providing a vessel 15 containing sulfamic acid solution and dipping the rotor housing in the bath of the sulfamic acid solution. Nickel electrodes 16 are placed against the inner surface 1a of the rotor housing 1 and the plating process is carried out by applying a positive voltage to the electrodes 16 and a negative voltage to the rotor housing 1 simultaneously agitating the solution by an agitator 17. The composite plating layer 14 thus formed is shown in an enlarged scale in FIG. 4.

Figure 6:
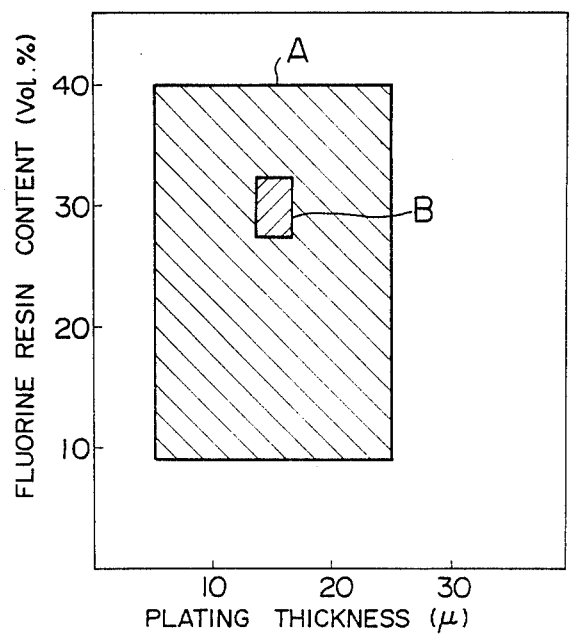
FIG. 6 is a diagram showing the range of the composite plating thickness and the fluorine resin content adopted in the present invention.

In FIG. 6, there are shown preferable ranges of the thickness of the composite plating layer 14 and the content in vol. % of the fluorine resin particles. The ranges define a region A which is covered by the present invention. In the region A, there is further defined a more restricted region B in which the composite plating layer is of relatively low hardness and has a relatively high self-lubricating property. The range B is therefore preferable in obtaining a low sliding drag. Since the composite plating layer 14 has a superior self-lubricating property so that it is possible to prevent seizure between the apex seals 6 and the inner surface 1a of the rotor housing 1. It is also possible to prevent uneven wear of the rotor housing inner surface 1a which may otherwise be produced to form chatter marks. Further, it is also possible to suppress wear of the apex seals 6.

In Table 1, there are shown physical properties of the composite plating layer of the present invention in comparison with the composite plating layer as taught by the previously mentioned Japanese patent application. As noted in the Table 1, the composite plating layer of the present invention has a lower friction coefficient and a lower hardness so that it is easy to establish an intimate relationship with the apex seals.

TABLE 1

|  | FRICTION UNDER A VERT. LOAD 500 Kg | | |
|---|---|---|---|
|  | STATIC FRICTION ($\mu$) | DYNAMIC FRICTION ($\mu$) | HARDNESS (Hv) |
| NICKEL—CARBON FLUORIDE COMPOSITE PLATING (PRIOR ART) | 0.0168 | 0.0157 | 500–600 |
| NICKEL—FLUORINE RESIN PLATING (INVENTION) | 0.0096 | 0.0096 | 280–460 |

Thus, according to the present invention, the composite plating layer is gradually worn in break-in operations of the engine so that the surface of the composite plating layer is smoothened. Further, nickel and fluorine resin particles removed by the wear are adhered to the sliding surfaces of the apex seals smoothening these surfaces. Thus the roughness on the sliding surfaces is rapidly removed so that pressure loss in the compression stroke can be effectively prevented.

It should further be noted that the composite plating layer 14 has a good corrosion resistant property and is also resistant to chemical agents such as gasoline. Therefore, even when the plating layer is applied to a rotor housing for a fuel injection type engine, it is not likely that the plating layer 14 is damaged or destroyed by the liquid fuel deposited on the inner surface of the rotor housing. Further, the composite plating layer 14 is of a high heat resistant property and shows a low friction coefficient even under a high temperature. Therefore, it is possible to ensure a satisfactory lubrication not only under normal engine operations but also under high speed, heavy load operations.

EXAMPLES

As shown in Table 2, test samples $A_1$, $A_2$, $A_3$, $A_4$, $B_1$ and $B_2$ have been prepared in accordance with the present invention, the samples $A_1$ through $A_4$ belonging to the region A in FIG. 6 and the samples $B_1$ and $B_2$ belonging to the region B. Further, test samples $C_1$ and $C_2$ have been prepared with a nickel-fluorine resin composite plating layer on a chromium plating layer, the composite plating layer being out of the ranges of the present invention. Further, test samples D, E and F have been prepared as representing prior art as in Table 3.

TABLE 2

|  |  | FLUORINE RESIN (Vol. %) | THICKNESS ($\mu$) |
|---|---|---|---|
| INVENTION | $A_1$ | 15 | 15 |
|  | $A_2$ | 15 | 15 |
|  | $A_3$ | 30 | 25 |
|  | $A_4$ | 40 | 15 |
|  | $B_1$ | 30 | 15 |
|  | $B_2$ | 30 | 15 |
| COMPARABLE SAMPLE | $C_1$ | 10 | 30 |
|  | $C_2$ | 50 | 10 |

TABLE 3

|  | SURFACE LAYER | THICKNESS OF SURFACE LAYER ($\mu$) |
|---|---|---|
| D | MIXTURE OF ACRYL RESIN AND $MoS_2$ | 15 |
| E | PRECOAT OF MIXTURE OF WAX TYPE VISCOUS OIL AND $MoS_2$ (50:50) |  |
| F | TiN PLATING | 2 |

The test samples are assemble in rotary piston engines with apex seals having composition shown in Table 4.

TABLE 4

| APEX |  | C | Si | Mn | P | S | Cr | Cu | Mo | Ni | Mg | V |
|---|---|---|---|---|---|---|---|---|---|---|---|---|
| SEAL | % WEIGHT | 3.5 | 2.3 | 0.4 | 0.06 | 0.1 | 0.5 | 1.0 | 1.5 | 1.0 | 0.04 | 0.2 |

Figure 7:
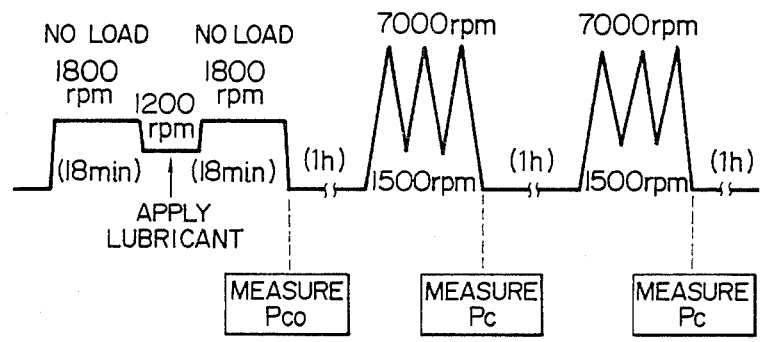
FIG. 7 is a diagram showing the engine operating pattern in testing the compressed pressure loss.
Figure 8:
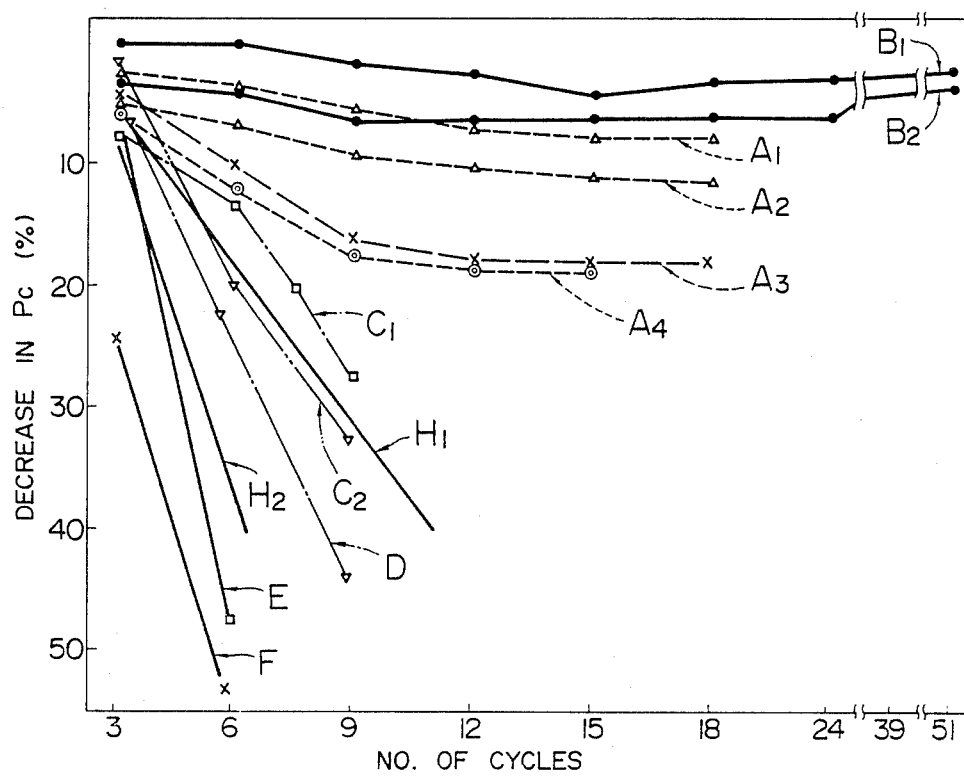
FIG. 8 is a diagram showing the results of the tests for compressed pressure loss.

The test engines were subjected to test operations with test patterns shown in FIG. 7. In the tests, the engine was operated without load at 1800 rpm for 18 minutes and decelerated to 1200 rpm where lubricant oil is supplied through their intake systems. Thereafter, the engine speed was increased to 1800 rpm and maintained at the speed under no load for 18 minutes then decelerated to 1500 rpm. At this point, the pressure in the compression working chamber is measured and recorded as the basic compression pressure Pco. The engine was operated at 1500 rpm for 1 hour while it is focedly cooled. Thereafter, the engine was subjected to three cycles of acceleration to 7000 rpm and deceleration to 1500 rpm, the one cycle being carried out in 1 minute. After the three cycles of operation, the compression pressure Pc was measured. The engine was then operated at 1500 rpm for 1 hour for forced cooling and similar three cycles of operation were carried out. FIG. 8 shows the results of tests. It will be noted in FIG. 8 that the rotor housings in accordance with the present invention show very small decrease in compression pressure as compared with other test samples. Among the test samples of the present invention, the samples $B_1$ and $B_2$ show very excellent results.

Figure 9:
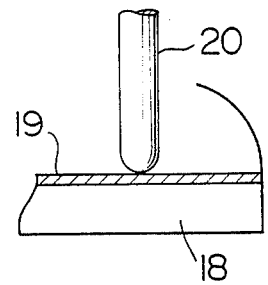
FIG. 9 is a fragmentary illustration of a pin-disc type wear test device.
Figure 10:
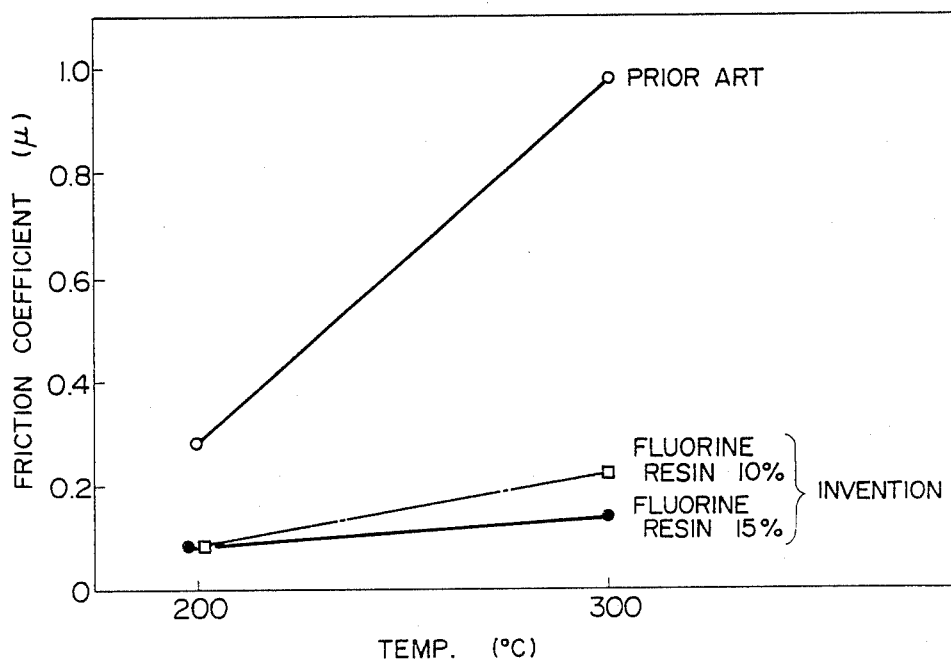
FIG. 10 shows results of the wear tests using the pin-disc type device.

Further tests were made to know changes in friction coefficient under changes in temperature. The tests were made by a pin-disc test machine shown in FIG. 9 in which a ring shaped test specimen 19 was secured to a turn table 18 and a chromium steel pin 20 of 5 mm in dia. was forced to the test specimen 19 with a load of 5 kg while rotating the turn table at a peripheral speed of 10 m/sec to measure the friction coefficient. The results of tests are shown in FIG. 10. As noted, the friction coefficient does not change remarkably in the test specimens of the present invention even under an increase in temperature. By the contrary, the test specimen simply having a chromium plating shows a large increase in the friction coefficient under an elevated temperature.

The invention has thus been shown and described with reference to specific examples, however, it should be noted that the invention is in no way limited to the details of the illustrated examples but changes and modifications may be made without departing from the scope of the appended claims.

What is claimed is:

1. A rotor housing for rotary piston engines, which has an inner wall formed with a first layer of chromium plating, and a second layer of nickel-fluorine resin composite plating formed on said first layer, said second layer of composite plating including 9 to 40 vol. % of fluorine resin particles dispersed in nickel matrix and having a thickness of 5 to 25 microns, said fluorine resin particles having a particle size of 0.3 to 3 microns, such that said second layer has a nature of establishing an intimate relationship with apex seals of the rotary piston engine when the second layer is brought into a sliding engagement with the apex seals.

2. A rotor housing in accordance with claim 1 in which said fluorine resin is selected from tetrafluoroethylene, tetrafluoroethylene/hexafluoropropylene copolymer and tetrafluoroethylene-perfluoroalkylvinylether copolymer.

* * * * *